March 13, 1956  B. D. STEVENSON  2,738,047
CLUTCH ACTUATOR TRIP

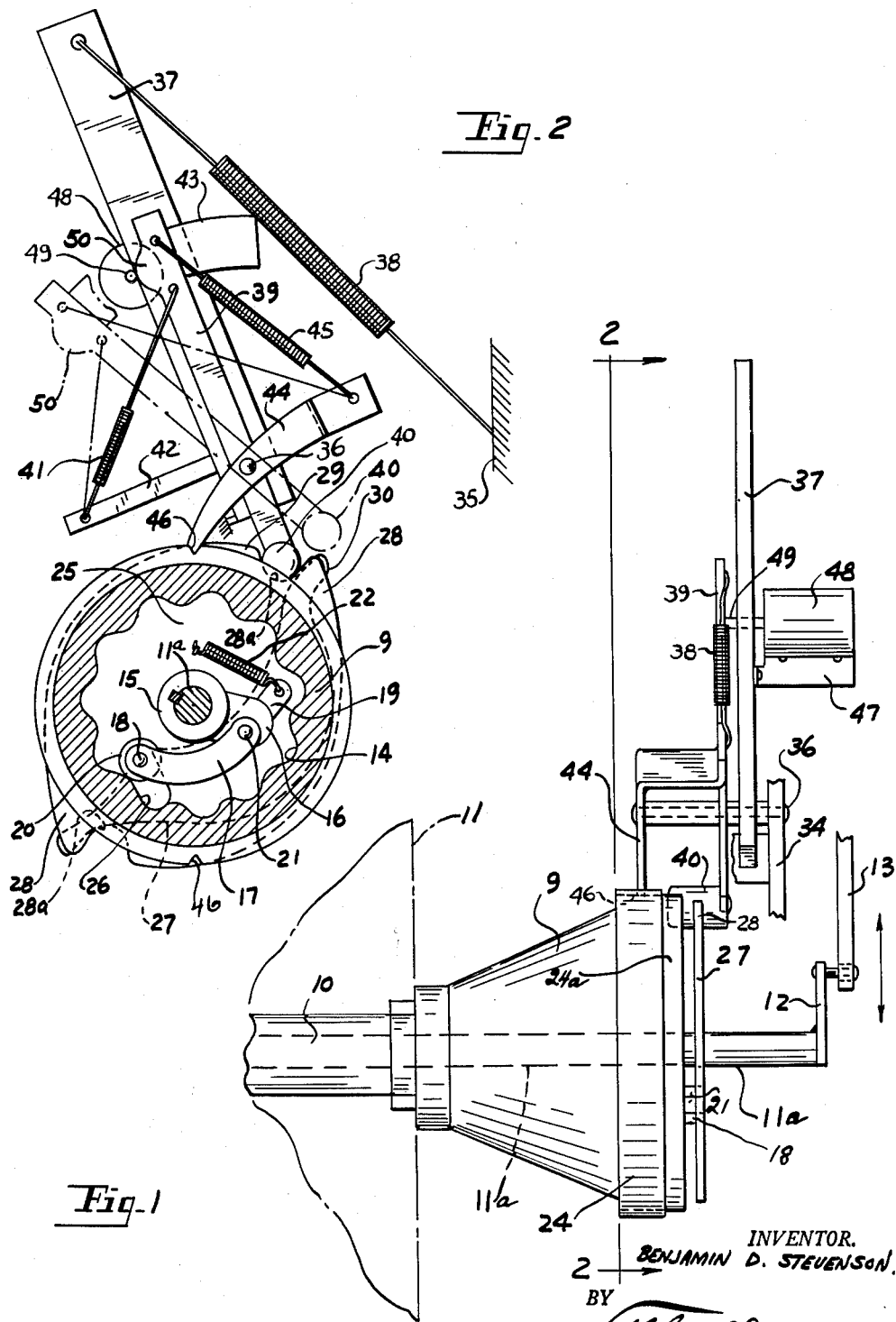

Filed May 19, 1951  2 Sheets-Sheet 2

INVENTOR.
BENJAMIN D. STEVENSON
BY
ATTORNEY.

United States Patent Office 2,738,047
Patented Mar. 13, 1956

2,738,047

CLUTCH ACTUATOR TRIP

Benjamin D. Stevenson, Flushing, Mich.

Application May 19, 1951, Serial No. 227,148

9 Claims. (Cl. 192—62)

My invention relates to a new and useful improvement in a clutch actuator trip adapted for tripping the clutch on various types of farm implements such as plows, drills, cultivators and so forth.

With the conventional type of construction, the operator manually operates a trip lever which will serve to release the clutch for movement to operative position so as to either raise or lower the implement used therewith. This operation of the lever by the operator is usually against the tension of a spring so that the spring serves to normally restore the lever to such a position that the clutch will automatically be engaged by a releasing mechanism and move to operative position.

In the present invention, the releasing lever is moved to releasing position by means of a spring and it is prevented from movement to releasing position by a solenoid operated catch or abutment. After the clutch has been tripped and it is desired to restore it to its former position, it is restored to its former position by a spring and it is an object of the present invention to provide a structure whereby, at one stage of the operation, one spring is of greater tension than the other and at the other stage of operation, the other spring is of greater tension.

Another object of the invention is the provision of a clutch actuator trip so constructed and arranged that it will be possessed of a minimum number of parts, durable, compact, easily and quickly operated, and highly efficient in use.

Other objects will appear hereinafter.

It is recognized that various modifications and changes may be made in the detail structure illustrated, without departing from the invention and it is intended that the present disclosure shall be considered but the preferred embodiment.

Fig. 1 is a side elevational view of the invention showing it with parts in fragments.

Fig. 2 is a sectional view taken on line 2—2 of Fig. 1.

Figure 3:
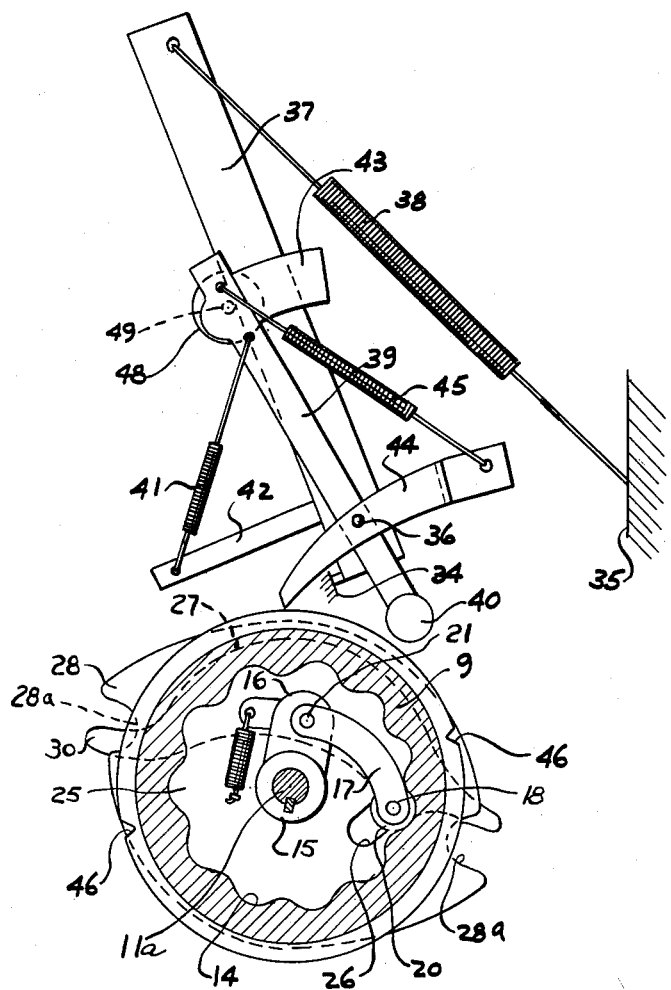
Fig. 3 is a view similar to Fig. 2, showing the parts in a different position.

In the drawings, I have illustrated a clutch housing 9 projecting outwardly from which is a tube 10 on which a traction wheel 11 is fixedly mounted so that the housing 9 and the traction wheel 11 rotate in unison with each other. Extending through the housing 9 and the tube 10 is an operating shaft 11a, to one end of which is fixedly attached the crank 12 pivotally connected at its outer end to one end of a lifting bar 13 which is connected to the frame which carries the implement to be lifted.

The housing 9 is provided at its end with an axially directed portion in which are formed a plurality of spaced apart notches 14. A cup-shaped cover member 24 having the bottom 25 fits over the axially directed portion of the housing 9. Formed on this bottom 25 and projecting inwardly of the cup-shaped structure is a hub 15 which is fixedly mounted on the shaft 11 and projecting outwardly from which is a bracket 16. Pivoted by means of a pivot pin 21 are the spaced apart actuating arms or links 17 and 19, 19 being longer than the arm 17. Positioned between the arms 17 and 19 and rotatably mounted on a pin 18 is a roller 20 which is adapted to engage in the notches 14. One end of a spring 22 is connected to the end of the arm 19 and the other end of spring 22 is connected to the plate 25 so that the spring normally tends to rock the arms 17 and 19 into a position for engaging the roller 20 in one of the notches 14. This pin 18 extends through a slot 26 formed in the plate 25.

The pin 18 projects through an actuating bar 27 which is pivoted, intermediate its ends, on the pin 21, so that a rocking of the actuating bar 27 will effect a rocking of the arms 17 and 19.

Formed on the periphery of the cup-shaped member is an inclined flange 28 terminating adjacent a peripheral notch 28a and at the opposite end of the notch 28a is a smaller outwardly projecting flange 29. This member 27 is provided, at its opposite ends, with a nose 30 which is adapted to project beyond the outer edge of the flange 28. This flange 28 is formed on opposite sides of the end plate or cup-shaped member so that there is a pair of notches 28a, diametrically opposite each other. These parts which have been described so far are of a structure which is well known and which of itself forms no part of the present invention.

Pivoted on the supporting frame, a part of which is designated by the numeral 34 and part by the numeral 35, by means of the pin 36 is an arm 37, normally rocked to the right of Fig. 2 or Fig. 1 by means of the spring 38, one end of which is attached to the arm 37 and the other end of which is attached to the frame 35. Pivoted on the arm 37, by means of the pin 36, is an arm 39, projecting outwardly from the face of the lower end of which is a boss or stud 40, of a size to engage in the recesses of 28a. In Fig. 2 this stud or boss 40 is shown in full lines engaged in the recess 28 and in dotted lines disengaged from the recess. Secured at one end to the upper end of the arm 39 is a spring 41, the other end of which is connected to an arm 42 which is rigidly attached to and projects outwardly from the arm 37. Connected to and extending laterally from the upper end of the arm 39 is a guard plate 43.

Pivoted by the pin 36 on the arms 39 and 37 is a pawl or dog 44 to one end of which is attached one end of a spring 45 the other end being attached to the arm 39 at a point positioned outwardly from the point of attachment of the spring 41 to the arm 39. This pawl 44 rides on the periphery of the cup-shaped member 24 and formed in this periphery, at diametrically opposite points, is a recess 46. In Fig. 2, the pawl 44 is shown engaged in one of these recesses 46. As shown in Fig. 1, the arm 44 is outwardly off-set from the arm 39.

A suitable bracket 47 is mounted on the arm 37 and serves to support the solenoid 48 having the core 49 which is adapted to engage the boss 50 on the arm 39. In Fig. 2, I have shown the mechanism in a position in which the trip is in the non-tripped position. When in this non-tripped position, the clutch is inoperative and the stud 40 is engaging in one of the recesses 28a and the plate 27 is rocked to a position to maintain the clutch in neutral position as shown in Fig. 2. When in this position, the stud 49 would be pressed outwardly to engage the boss 50 and prevent a movement of the parts from the full line position in Fig. 2 to dotted line position. Upon energizing the solenoid 48, this core 49 would be moved to the right of Fig. 1 and retracted out of engagement with the boss 50 so that the arm 39 would be rocked to the dotted line position by the spring 41. This rocking would, of course, be against the tension of the spring 45. Upon this rocking movement the stud 40 would be moved out of engagement with the recess 28a and out of engagement with the plate 27 which would then rock to the position shown in Fig. 3, and the roller 23 would move into one of the recesses 14, thus rendering the clutch operative. Immediately upon the movement of the clutch to closed or operative position, the cup-shaped member would rotate, thus carrying the notch 46 away from the end of the pawl 44 so that the pawl 4 would then be riding on the periphery of this cup-shaped member 24 until it reached the next notch 46. As soon as the pawl 44 moves out of the notch 46, the tension on the spring 45 would be increased so that the tension on the spring 45 would be greater than on the spring 41 and boss or stud 40 would then ride on the periphery of the cup-shaped member under pressure effected by the spring 38. When this boss or stud 40 rides over the flange 29, it would again drop into one of the recesses 28a. It would drop into the recess 28a prior to the engagement of the end of the pawl with the notch 46 and as the member 40 drops in the recess 28a, the arm 39 would have moved to the position shown in Fig. 2 in full lines so that the plunger or core 49 of the solenoid would have moved outwardly in response to spring pressure to engage in front of the arm 39 and prevent its rocking to the left of Fig. 2. Immediately upon movement outwardly of this plunger or core 49 into engaging position, the end of the pawl 44 will again engage in the recess 46 and thus the tension of the spring 45 would be reduced below the tension of the spring 41.

The solenoid 48 would be provided with a source of energy from a battery (not shown) and a suitable switch (not shown) would be positioned adjacent to the driver of the implement to be raised. When it is desired to raise or lower the vehicle through a rotation of the shaft 11 upon a movement of the clutch to closing position the operator would press the switch to close the circuit to the solenoid. It is preferred that the switch be of the spring pressed type so that upon release from pressure on the switch the circuit to the solenoid will be broken.

It is obvious that in this way, I have provided a clutch actuator trip which is spring operated in both directions; that is, it is spring operated to move out of one position and spring actuated to move into another position and that the operation of the device is solenoid controlled.

When the member 40 moves to the dotted line position of Fig. 2, this movement will be effected by the pull of the spring 41 and the movement will take effect immediately upon the disengagement of the member 49 from the boss 50. In this movement, the guard plate 43, which is attached to the member 39, will ride in front of the core 49 and prevent it from moving outwardly to its normal position. The plate 27 will rock so that the end portions 30 thereof are overlying the notches 28a. While the end of the pawl 44 is riding on the periphery of the cover 24, the spring 40 cooperates with the spring 38 which has a tendency to rock the plate 27, and will maintain the member 40 in engagement with the outwardly projecting flange 24a on the cover 24. Consequently, when the member 40 reaches the next notch 28a the arm 39 will rock to the right of Fig. 2 from the dotted line position to the full line position and the movement of this arm is effected by the pull of the spring 45. Immediately upon engagement of the member 40 in the notch 40a, the end of pawl 44 will ride into the end of the notch 46 an thereupon the tension of the spring 41 becomes greater than the tension of the spring 45.

While I have shown the structure as solenoid controlled, it is obvious that it may be mechanically or manually controlled. The plunger 49 which is normally spring pressed into position for engagement with the front edge 50 might equally well be retracted from engaging position by means of a cord attached thereto or any other suitable mechanical means. In such an event, the operation of the mechanism would be the same. The trip would automatically, in response to the pull of spring 41, be moved to tripping position, which the dotted line shows in Fig. 2. Likewise, it would automatically be moved to non-tripping position, which is the full line position shown in Fig. 2.

What I claim is:

1. A device of the class described adapted for use with a rotatable clutch member having a pair of recesses in its periphery positioned diametrically opposite each other, and provided on its periphery with a pair of diametrically opposite notches circumferentially offset from said recesses, comprising: a swingably mounted supporting bar; an arm swingably mounted intermediate its ends on said bar; an abutment member carried by said arm and moveable into and out of engagement with said recesses; a spring for swinging said arm in a direction for disengaging said abutment member from said recess; a plunger on said solenoid normally in engagement with said arm for preventing swinging of said arm in response to said spring, and moveable out of engagement with said arm upon energizing of said solenoid; a spring connected to said arm and tending to swing said arm in the opposite direction; and means for varying the relative effective force of said springs, alternately rendering one of said springs of greater effective force than the other.

2. A device of the class described adapted for use with a rotatable clutch member having a pair of diametrically opposite recesses on its periphery and a pair of diametrically opposite notches on its periphery, said notches being circumferentially and axially offset from said recesses, comprising: a swingably mounted supporting bar; a spring tending normally to swing said bar in one direction; an arm swingably mounted intermediate its ends on said bar; an abutment member carried by said arm and swingable radially inwardly and outwardly of said clutch member into and out of engagement with said recesses; and a spring maintaining said abutment member, subsequent to its movement out of said recesses and upon the rotation of said clutch member, in engagement with the periphery of said clutch member.

3. In a device of the class described, adapted for use with a rotatable clutch member, having a pair of diametrically opposite recesses on its periphery and a pair of diametrically opposite notches in its periphery, a structure comprising: a supporting member; an arm swingably mounted intermediate its ends on said member; an abutment member carried by said arm and engageable in said recesses; a spring connected at one end to a stationary member, and at its opposite end to said arm for normally swinging said arm in one direction, for moving said abutment member out of engagement with said recesses; a pawl pivotally mounted intermediate its ends and engageable at one of its ends with the periphery of said clutch member and adapted for engaging in said notches, upon alignment of one of said notches therewith, and riding out of the notch engaged upon the rotation of said clutch member; a spring connected at one end to said arm and at its opposite end to the opposite end of said pawl, for normally maintaining an end of said pawl in engagement with the periphery of said clutch member.

4. In a device of the class described, adapted for use with a rotatable clutch member, having a pair of diametrically opposite recesses on its periphery, and a pair of diametrically opposite notches in its periphery, a structure comprising a supporting member; an arm swingably mounted intermediate its ends on said member; an abutment member carried by said arm and engageable in said recesses; a spring connected at one end to a stationary member, and at its opposite end to said arm for normally swinging said arm in one direction, for moving said abutment member out of engagement with said recesses; a pawl pivotally mounted intermediate its ends and engageable at one of its ends with the periphery of said clutch member and adapted for engaging in said notches, upon alignment of one of said notches therewith, and riding out of the notch engaged, upon the rotation of said clutch member; a spring connected at one end to said arm and at its opposite end to the opposite end of said pawl, for normally maintaining an end of said pawl in engagement with the periphery of said clutch member, said first-named spring being of greater tension than said second-named spring upon engagement of the end of said pawl in one of said notches, and said second-named spring being of greater tension than said first-named spring upon the end of said pawl riding out of said notches.

5. In a device of the class described, adapted for use with a rotatable clutch member, having a pair of diametrically opposite recesses on its periphery, and a pair of diametrically opposite notches in its periphery, a structure comprising: a supporting member; an arm swingably mounted intermediate its ends on said member; an abutment member carried by said arm and engageable in said recesses; a spring connected at one end to a stationary member and at its opposite end to said arm for normally swinging said arm in one direction, for moving said abutment member out of engagement with said recesses; a pawl pivotally mounted intermediate its ends and engageable at one of its ends with the periphery of said clutch member and adapted for engaging in said notches, upon alignment of one of said notches therewith, and riding out of the notch engaged, upon the rotation of said clutch member; a spring connected at one end to said arm and at its opposite end to the opposite end of said pawl, for normally maintaining an end of said pawl in engagement with the periphery of said clutch member, said first-named spring being of greater tension than said second-named spring upon engagement of the end of said pawl in one of said notches, and said second-named spring being of greater tension than said first-named spring upon the end of said pawl riding out of said notches; a solenoid; and a plunger on said solenoid, movable into position for engaging said arm and preventing swinging of the same in response to the tension of said first-named spring, and moveable out of engagement with said arm upon energizing of said solenoid.

6. In a device of the class described, a swingable arm; a spring for swinging said arm in one direction; a solenoid; a plunger on said solenoid engageable with said arm for preventing swinging movement of the same in response to said spring and moveable out of engagement with said arm upon energizing of said solenoid; and a guard plate carried by said arm, swingable across said plunger upon swinging of said arm for preventing said plunger moving into position for engaging said arm prior to the return of said arm to its normal position.

7. In a device of the class described, a swingable arm; a spring for swinging said arm in one direction; a solenoid; a plunger on said solenoid engageable with said arm for preventing swinging movement of the same in response to said spring and moveable out of engagement with said arm upon energizing of said solenoid; and a guard plate carried by said arm, swingable across said plunger upon swinging of said arm for preventing said plunger moving into position for engaging said arm prior to the return of said arm to its normal position; and a spring connected to said arm for swinging said arm in the opposite direction and returning the same to its normal position.

8. In a device of the class described adapted for use with a rotatable clutch member having a pair of recesses in its periphery positioned diametrically opposite each other, a structure comprising: a supporting body; an arm swingably mounted intermediate its ends on said body; an abutment member carried by one end of said arm and engageable in said recesses upon swinging of said arm in one direction and moveable out of engagement with said recesses upon swinging of said arm in the opposite direction; a moveable plunger moveable into and out of operating positions, upon movement into operating position for engaging said arm and preventing swinging of said arm in said one direction; a spring connected to said arm for swinging said arm in said one direction; a pawl pivotally mounted intermediate its ends on said supporting body, the periphery of said clutch member having a pair of diametrically opposite notches formed therein for reception of one end of said pawl; a spring connected at one end to the opposite end of said pawl and at its oppossite end to the end of said arm for swinging said arm in said other direction and maintaing the end of said pawl in engagement with the periphery of said clutch member, said springs being relatively of greater effective force, alternately, upon engagement and disengagement of the end of said pawl in said notches.

9. In a device of the class described adapted for use with a rotatable clutch member having a pair of recesses in its periphery positioned diametrically opposite each other, a structure comprising: a supporting body; an arm swingably mounted intermediate its ends on said body; an abutment member carried by one end of said arm and engageable in said recesses upon swinging of said arm in one direction and moveable out of engagement with said recesses upon swinging of said arm in the opposite direction; a moveable plunger moveable into and out of operating positions, upon movement into operating position for engaging said arm and preventing swinging of said arm in said one direction; a spring connected to said arm for swinging said arm in said one direction; a pawl pivotally mounted intermediate its ends on said body, the periphery of said clutch member having a pair of diametrically opposite notches formed therein for reception of one end of said pawl; a spring connected at one end to the opposite end of said pawl and at its opposite end to the end of said arm for swinging said arm in said other direction and maintaining the end of said pawl in engagement with the periphery of said clutch member, said springs beign relatively of greater effective force, alternately, upon engagement and disengagement of the end of said pawl in said notches; and a guard plate carried by said arm moveable in front of said plunger upon swinging of said arm in said one direction and preventing said plunger from moving into operative position prior to the swinging of said arm in said other direction.

References Cited in the file of this patent

UNITED STATES PATENTS

| | | |
|---|---|---|
| 867,076 | Porteous | Sept. 24, 1907 |
| 1,427,357 | Caughey | Aug. 29, 1922 |
| 2,119,757 | Strandlund | June 7, 1938 |
| 2,517,172 | Bjerre et al. | Aug. 1, 1950 |
| 2,577,230 | Chipman | Dec. 4, 1951 |